United States Patent
Jasklowski (10) Patent No.: US 9,581,145 B2
(45) Date of Patent: Feb. 28, 2017

(54) SHAPE MEMORY ALLOY ACTUATION SYSTEM FOR VARIABLE AREA FAN NOZZLE

(71) Applicant: The Boeing Company, Chicago, IL (US)

(72) Inventor: Christopher T. Jasklowski, Redmond, WA (US)

(73) Assignee: The Boeing Company, Chicago, IL (US)

( * ) Notice: Subject to any disclaimer, the term of this patent is extended or adjusted under 35 U.S.C. 154(b) by 894 days.

(21) Appl. No.: 13/893,372

(22) Filed: May 14, 2013

(65) Prior Publication Data

US 2014/0338324 A1    Nov. 20, 2014

(51) Int. Cl.
*F03G 7/06* (2006.01)
*F02K 1/12* (2006.01)
*F02K 1/80* (2006.01)

(52) U.S. Cl.
CPC ............ *F03G 7/065* (2013.01); *F02K 1/1207* (2013.01); *F02K 1/805* (2013.01); *F05D 2300/505* (2013.01); *Y02T 50/672* (2013.01)

(58) Field of Classification Search
CPC ............ F03G 7/05; F02K 1/00; B05B 12/00; B64C 9/00
See application file for complete search history.

(56) References Cited

U.S. PATENT DOCUMENTS 3,892,358 A * 7/1975 Gisslen .................. F02K 1/805
239/265.39

4,049,199 A * 9/1977 Nightingale .......... F02K 1/1261
239/265.39
4,994,660 A * 2/1991 Hauer ..................... F02K 1/008
239/265.19
5,222,699 A    6/1993 Albach et al.
5,794,893 A    8/1998 Diller et al.
(Continued)

FOREIGN PATENT DOCUMENTS

EP    1130243 A2    9/2001
EP    1878877 A2    1/2008

OTHER PUBLICATIONS

Extended European Search Report, European Application No. 14157118.2 (foreign counterpart to instant application), dated Sep. 3, 2014.

(Continued)

*Primary Examiner* — Thomas Denion
*Assistant Examiner* — Shafiq Mian
(74) *Attorney, Agent, or Firm* — Ostrager Chong Flaherty & Broitman P.C.

(57) ABSTRACT

A variable area fan nozzle comprising an array of hinged rigid petals and a petal actuation system in which the principle of actuation is realized by changes in shape (i.e., deformation) of the actuators rather than by movement of cooperating mechanical parts. Because these actuators have no rotating or sliding mechanical components, wear and associated maintenance are reduced. Each deformable actuator has a portion made of shape memory alloy that has been trained to change shape in a specific manner when heated to a temperature above a transition temperature. In addition, each shape memory alloy actuator is shaped to act as a fairing to reduce aerodynamic drag.

17 Claims, 6 Drawing Sheets

(56) References Cited

U.S. PATENT DOCUMENTS

| | | | |
|---|---|---|---|
| 5,839,698 A | 11/1998 | Moppert | |
| 6,100,463 A | 8/2000 | Ladd et al. | |
| 6,209,824 B1 | 4/2001 | Caton et al. | |
| 6,213,433 B1 | 4/2001 | Gruensfelder et al. | |
| 6,318,070 B1 | 11/2001 | Rey et al. | |
| 6,349,903 B2 | 2/2002 | Caton et al. | |
| 6,983,588 B2 * | 1/2006 | Lair | F01D 17/16 239/265.33 |
| 7,458,221 B1 | 12/2008 | Arnold et al. | |
| 7,464,548 B2 | 12/2008 | Yson et al. | |
| 7,721,549 B2 * | 5/2010 | Baran | F02K 1/002 239/265.19 |
| 7,721,551 B2 * | 5/2010 | Hanson | F01D 17/141 239/265.33 |
| 7,797,944 B2 * | 9/2010 | Morford | F02K 1/06 239/265.39 |
| 8,118,264 B2 | 2/2012 | Mabe et al. | |
| 8,342,447 B2 | 1/2013 | Etling | |
| 8,397,485 B2 * | 3/2013 | Wood | B64C 7/02 60/204 |
| 8,613,398 B2 * | 12/2013 | Calder | F02K 1/383 181/215 |
| 2002/0073691 A1 * | 6/2002 | Rey | F02K 1/1207 60/226.1 |
| 2005/0198777 A1 | 9/2005 | Mabe | |
| 2009/0226303 A1 * | 9/2009 | Grabowski | F02C 9/16 415/151 |
| 2010/0018212 A1 * | 1/2010 | Core | B64D 33/06 60/771 |
| 2010/0115958 A1 * | 5/2010 | Parham | F02K 1/09 60/771 |
| 2010/0229527 A1 * | 9/2010 | Amkraut | F02K 1/09 60/226.2 |
| 2011/0030380 A1 | 2/2011 | Widdle, Jr. et al. | |
| 2012/0282474 A1 | 11/2012 | Madsen et al. | |

OTHER PUBLICATIONS

Canadian Office Action dated Apr. 9, 2015, Canadian Application No. 2,843,567 (Canadian counterpart to instant patent application).

* cited by examiner

SHAPE MEMORY ALLOY ACTUATION SYSTEM FOR VARIABLE AREA FAN NOZZLE

BACKGROUND

This disclosure relates generally to turbofan engines and, more particularly, to turbofan engines having a variable area fan nozzle. In particular, this disclosure relates to variable area fan nozzles that comprise a plurality of circumferentially arranged petals which are movable for varying the exit or throat area of the nozzle.

Aircraft noise pollution is a significant environmental problem for communities near airports. Jet engine exhaust accounts for a majority of the noise produced by engine-powered aircraft during takeoff. Because it occurs at a relatively low frequency, jet engine exhaust noise is not effectively damped by the atmosphere alone.

Bypass turbofan engines typically produce two exhaust stream components: the engine core flow and the fan flow. The engine core flow is discharged from a core flow nozzle after passing through a core engine. The fan flow passes through an annular passageway formed by a core engine nacelle which surrounds the core engine and a fan duct which surrounds at least a portion of the core engine nacelle. An outlet for the fan duct is defined intermediate the core nacelle and a variable area fan nozzle. In some implementations, the variable area fan nozzle is secured to the downstream end of an axially translatable thrust reverser sleeve, which forms a part of the fan duct. The fan flow exits this outlet. The engine and fan flows collectively produce thrust that propels the aircraft forward.

In bypass turbofan engines, the engine core flow throat area at the core flow nozzle and the fan flow throat area at the fan nozzle are preferably optimized for specific engine operating conditions. For example, during takeoff, a relatively high level of thrust is required from the engines as compared to lower levels of thrust that are required during cruise flight. Increasing the quantity or mass of airflow through the fan duct having a fixed throat area at the fan nozzle results in an increase in the velocity of the airflow. An increase in the nozzle exit velocity results in an increase in the amount of noise that is generated by the nozzle.

One approach to increasing the fan nozzle throat area as a means to reduce noise generated during high-thrust events such as during takeoff is through the use of movable flaps or petals which form the fan nozzle exit external boundary. The flaps or petals may be deflected outwardly to enlarge the throat area of the fan nozzle and thereby reduce the exhaust velocity or, conversely, they may be deflected inwardly to reduce the throat area of the fan nozzle and thereby increase the exhaust velocity.

It is known to vary the area of the fan nozzle (thereby modulating the fan flow) by deflecting flaps or panels (hereinafter "petals") attached to the trailing lip area of an axially translatable thrust reverser sleeve. As used herein (including in the claims), the term "sleeve" includes at least the following configurations: (1) a one-piece axially translatable sleeve that extends around a major portion of the circumference of the fan duct, from one side of the engine pylon to the other; and (2) two axially translatable half-cowls mounted on rails fixed to upper and lower beams and extending from the upper beam to the lower beam. In accordance with the latter configuration, the upper beam is the main hinge beam that allows the reverser to open for engine access and removal. The lower beam (referred to hereinafter as "latch beam") provides a means for locking together the two half-cowls. Thus the second configuration typically has two upper hinge beams and two latch beams.

Many systems for actuating petal deflection have been proposed which apply actuation to the leading edge area of the petal and require large force to move the petal. These solutions also employee mechanical components that create mechanical friction and wear.

It would be desirable to provide a petal actuation system in which the actuators weigh less than mechanical actuators of comparable power, and which are subject to less wear and therefore require less maintenance.

SUMMARY

The subject matter disclosed herein is directed to a petal actuation system in which the principle of actuation is realized by change of shape (i.e., deformation) of the actuator rather than by movement of cooperating mechanical parts. Because these actuators have no rotating or sliding mechanical components, wear and associated maintenance are reduced. In accordance with the embodiments disclosed herein, the deformable actuators comprise shape memory alloys (SMA) which have been trained to change shape in specific manners when energized (i.e., heated). Each SMA actuator is shaped to act as a fairing to reduce aerodynamic drag. The use of SMA actuators enables the design of lighter flow control surfaces by restoring the hoop strength of the nacelle at the trailing edge. The design of the SMA actuators also improves dependability of the system, because if the actuator system were to fail, the adjacent petals would stay at their last commanded positions.

In accordance with some embodiments, the petal actuation system comprises two sets of circumferentially distributed one-way SMA actuators, one set which can be heated to deflect the petals outward and the other set which can be heated to deflect the petals inward. The one-way SMA actuators are arranged in pairs between adjacent petals, each pair comprising respective oppositely acting (i.e., antagonistic) SMA actuators of the first and second sets. The pairs of antagonistic SMA actuators are installed near the trailing edges of the petals. Attaching the SMA actuators near the trailing edge of the nozzle minimizes the force required to control the angular position of the flow surfaces.

In accordance with other embodiments, the petal actuation system comprises one set of circumferentially distributed two-way SMA actuators. (As used herein, the term "two-way SMA actuator" refers to an actuator comprising shape memory alloy which has been trained to produce a two-way memory effect.) Each two-way SMA actuator can be alternately heated and cooled to respectively deflect the petals outward and inward (or, in the alternative, inward and outward). Like the one-way SMA actuators, the two-way SMA actuators are arranged between adjacent petals near their trailing edges.

One aspect of the subject matter disclosed herein is a variable area fan nozzle comprising: a support member having a curved shape; first and second petals coupled to the support member in a manner that allows each of the first and second petals to deflect inward or outward, the first and second petal being separated by a gap; and a body comprising a first portion that spans the gap, and second and third portions connected to the first portion and respectively attached to the first and second petals. The first portion is made of shape memory alloy having the characteristic that it undergoes a first shape change when its temperature is increased from below to above a transition temperature. The body is arranged to deflect the first and second petals when the first portion of the body undergoes the first shape change. Preferably, the first portion of the body has a profile designed to minimize aerodynamic drag (e.g., a V-shaped cross section). In the many cases wherein the variable area fan nozzle comprises left and right fan nozzle assemblies, then each fan nozzle assembly may comprise the elements mentioned in this paragraph.

In accordance with one embodiment, the shape memory alloy may have the further characteristic that it undergoes a second shape change when its temperature is decreased from above to below the transition temperature. In this instance, the body will deflect the first and second petals outward when the first portion of the body undergoes one of the two shape changes and inward when the first portion of the body undergoes the other shape change.

In accordance with another embodiment, instead of employing two-way shape memory alloy, the variable area fan nozzle may further comprise a second body comprising a first portion that spans the gap, and second and third portions connected to the first portion of the second body and respectively attached to the first and second petals. This embodiment may have the following further features: (a) the first portion of the second body is made of shape memory alloy having the characteristic that it undergoes a second shape change when its temperature is increased from below to above a transition temperature; (b) the second body is arranged to deflect the first and second petals inward when the first portion of the second body undergoes the second shape change; and (c) the first body is arranged to deflect the first and second petals outward when the first portion of the first body undergoes the first shape change.

Another aspect of the subject matter disclosed herein is a method for varying an exit area of a nozzle, comprising increasing the temperatures of respective portions of a plurality of elements from below to above a transition temperature, the respective portions of the first plurality of elements being made of shape memory alloy that changes shape during an increase in temperature from below to above the transition temperature.

In accordance with a further aspect, a variable area fan nozzle comprises: a plurality of petals which can be deflected inward or outward in unison; and a plurality of petal deflection actuators attached to the petals, wherein each petal deflection actuator comprises shape memory alloy that changes shape when its temperature is increased from below to above a transition temperature, which shape changes cause the petals to deflect.

In accordance with one embodiment, the shape memory alloy also changes shape when its temperature is decreased from above to below the transition temperature. The petals deflect in one direction when the petal deflection actuators change shape due to increasing temperature and the petals deflect in the opposite direction when the petal deflection actuators change shape due to decreasing temperature.

In accordance with another embodiment, the variable area fan nozzle further comprises a second plurality of petal deflection actuators attached to the petals, wherein each petal deflection actuator of the second plurality comprises shape memory alloy that changes shape when its temperature is increased from below to above a transition temperature. The shape changes in the first plurality of petal deflection actuators cause the petals to deflect on one direction and the shape changes of the second plurality of petal deflection actuators cause the petals to deflect in the opposite direction.

Yet another aspect is an apparatus installed on an aircraft, comprising: a sleeve or duct having a trailing lip area comprising a support member having a curved shape; a plurality of petals coupled to the support member in a manner that allows each petal to deflect inward or outward, wherein adjacent petals are separated by respective gaps; a plurality of deformable elements distributed in the gaps, each deformable element comprising shape memory alloy that changes shape when heated to a temperature above a transition temperature; a plurality of electric heaters thermally coupled to respective surfaces of the deformable elements; and a computer system programmed to control the supply of electrical power to the electric heaters. This apparatus may further comprise one or more sensors for generating position feedback signals representing the current positions of the petals. Accordingly, the computer system is programmed to provide electrical pulses to the heaters to change or maintain the shapes of the deformable elements, the number of pulses being dependent on the results of a comparison of target position data representing target positions of the petals and position feedback data derived from the position feedback signals.

Other aspects are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments will now be described as applied to the thrust reverser sleeve of a turbofan aircraft engine. However, the variable area fan nozzle systems disclosed also have application to the trailing lip area of fan ducts which do not incorporate a thrust reverser sleeve.

Figure 1:
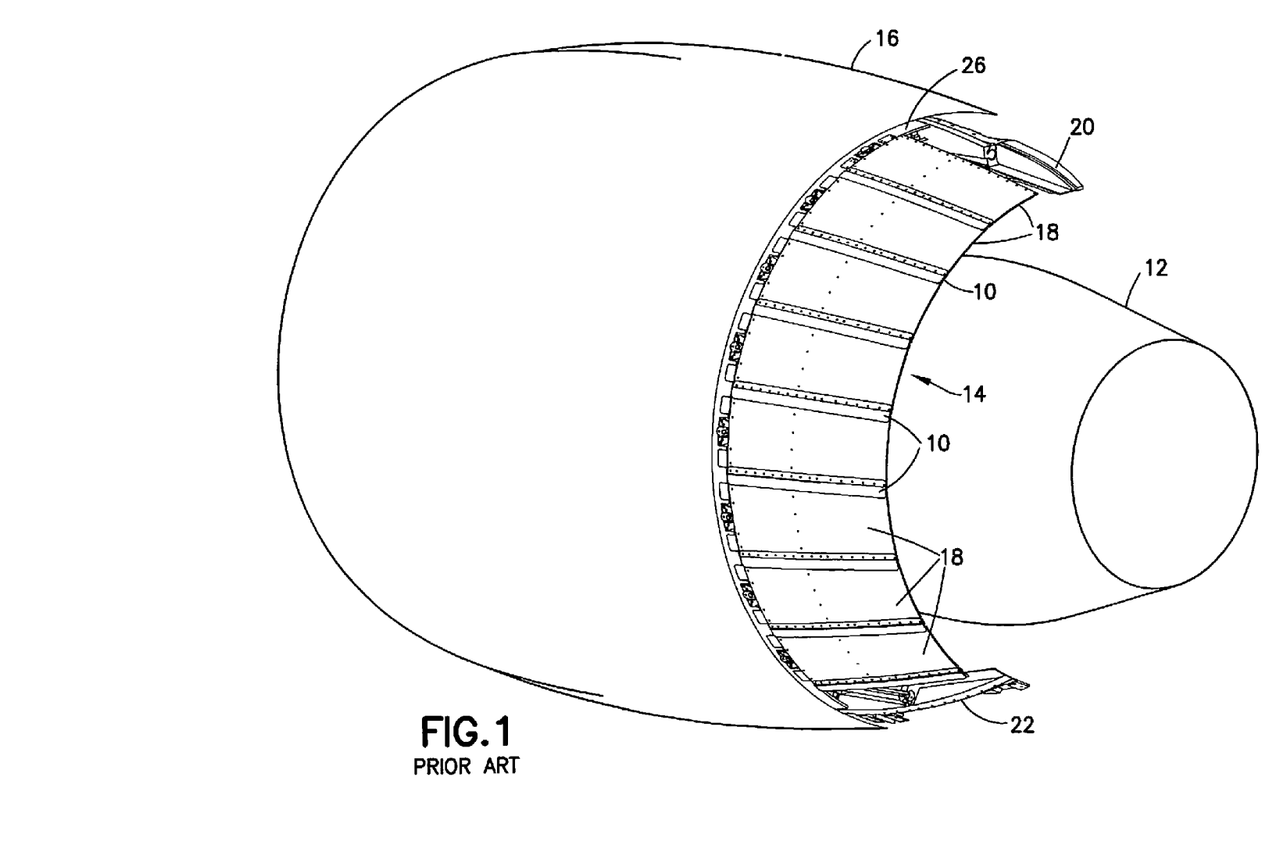
FIG. 1 is a diagram showing an isometric view of portions of a typical aircraft turbofan engine having a variable area fan nozzle comprising left and right assemblies (only the left assembly is shown).

FIG. 1 shows an isometric view of portions of a typical aircraft turbofan engine having a variable area fan nozzle comprising left and right assemblies (only the left assembly is shown). A core engine nacelle surrounds the core engine (not shown). The turbofan engine provides thrust from both a core flow of engine exhaust exiting a core flow nozzle 12 that forms a downstream end of the core engine nacelle, and a fan flow exiting from a variable area fan nozzle 14 (including the right assembly not shown) mounted to the downstream end or lip area of a thrust reverser sleeve 16. The sleeve 16 overlaps at least a portion of the core engine nacelle. The core flow generally has a higher velocity than the fan flow.

In accordance with one known implementation, the variable area fan nozzle 14 comprises a multiplicity of hinged rigid petals 18 which are configured to alter the fan flow passing through the fan duct when the petals are deflected inward or outward. Optionally, the petals 18 may have chevrons (not shown) attached to the distal (i.e., aft) ends thereof. The petals 18 are disposed side by side along a trailing lip of the thrust reverser sleeve 16. On the one hand, if the thrust reverser sleeve were a one-piece axially translatable sleeve (not shown in FIG. 1), then the petal array would extend around a major portion of the circumference of the fan duct, from one side of the engine pylon to the other. On the other hand (as shown in FIG. 1), if the thrust reverser sleeve comprises two axially translatable half-cowls mounted on rails fixed to an upper (i.e., hinge) beam 20 and a lower (i.e., latch) beam 22, then the petal array consists of two sets of petals attached to the respective half-cowls, each petal set comprising eight petals circumferentially distributed along a curved line extending from the respective upper beam to the respective lower beam on a respective side of the engine.

In accordance with the embodiment shown in FIG. 1, the forward ends of petals 18 are pivotably coupled by respective hinges to a bulkhead 26 having the shape of a circular arc which is centered at an axis. Optionally, the hinges can be flexible (i.e., living) hinges made of composite or metallic material. The ends of the arc-shaped bulkhead 26 are supported by hinge beam 20 and latch beam 22. A control system is configured to control an actuation system (not shown in FIG. 1) which deflects the petals 18 inward from their nominal positions during cruise flight conditions to maximize fuel efficiency. When the actuation system is reversed, the petals return to their nominal positions.

For each set of petals, adjacent petals 18 are separated by a triangular or trapezoidal gap or space, each such gap being occupied by a respective elastomeric seal, which is fastened to adjoining petals to ensure zero leakage. In FIG. 1, the elastomeric seals are covered by respective gap covers 10, each gap cover 10 being attached to the left edge of a respective petal 18 and being not attached to the adjacent petal, which allows the gap to alternately narrow and widen as the petal move inward and outward respectively.

Many types of actuation systems for controlling the positions of the petals of a variable area fan nozzle have been proposed. In the petal actuation systems disclosed herein, the principle of actuation is realized by change of shape (i.e., deformation) of the petal deflection actuators rather than by movement of cooperating mechanical parts. In accordance with the embodiments disclosed herein, the deformable actuators comprise shape memory alloys which have been trained to change shape in specific manners when heated. Each SMA actuator is shaped to act as a fairing to reduce aerodynamic drag.

In accordance with one embodiment shown in FIGS. 2-5, the petal actuation system comprises two sets of circumferentially distributed one-way SMA actuators, one set which can be heated to deflect the petals outward and the other set which can be heated to deflect the petals inward. The one-way SMA actuators are arranged in pairs between adjacent petals, each pair comprising respective oppositely acting (i.e., mutually antagonistic) SMA actuators of the first and second sets. The pairs of antagonistic SMA actuators are installed near the trailing edges of the petals. Attaching the SMA actuators near the trailing edge of the nozzle minimizes the force required to control the angular position of the flow surfaces.

Figure 2:
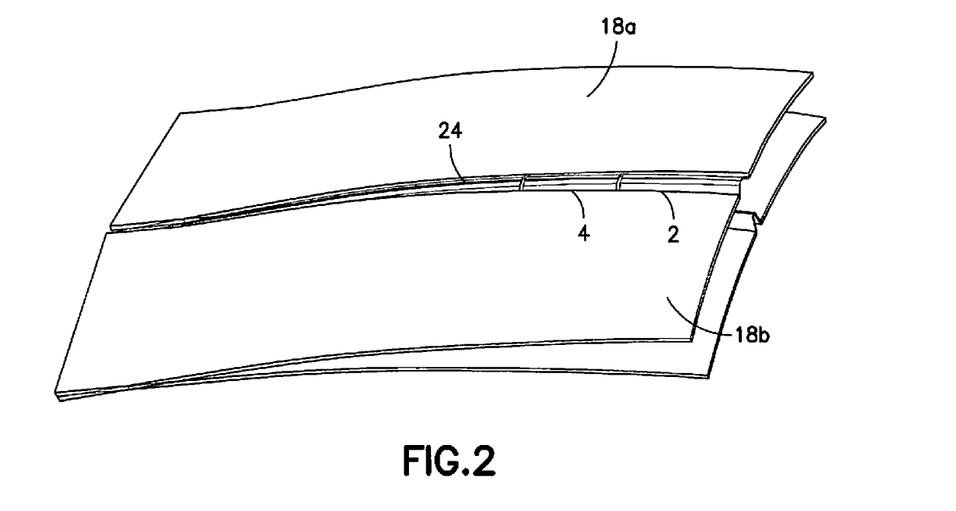
FIG. 2 is a diagram showing an isometric view (from above) of a pair of adjacent petals which can be alternatingly deflected inward or outward by changing the shape of one or the other of a pair of mutually antagonistic deformable actuators disposed in a gap near the trailing edges of the petals in accordance with one embodiment. The petals are shown in outwardly (upper) and inwardly (lower) deflected positions.

FIG. 2 shows an isometric view (from above) of a pair of adjacent petals 18a and 18b which can be alternatingly deflected inward or outward by changing the shape of one or the other of a pair of mutually antagonistic deformable actuators 2 and 4 disposed in a gap near the trailing edges of the petals in accordance with one embodiment. The petals are shown in outwardly (upper) and inwardly (lower) deflected positions.

Figure 6:
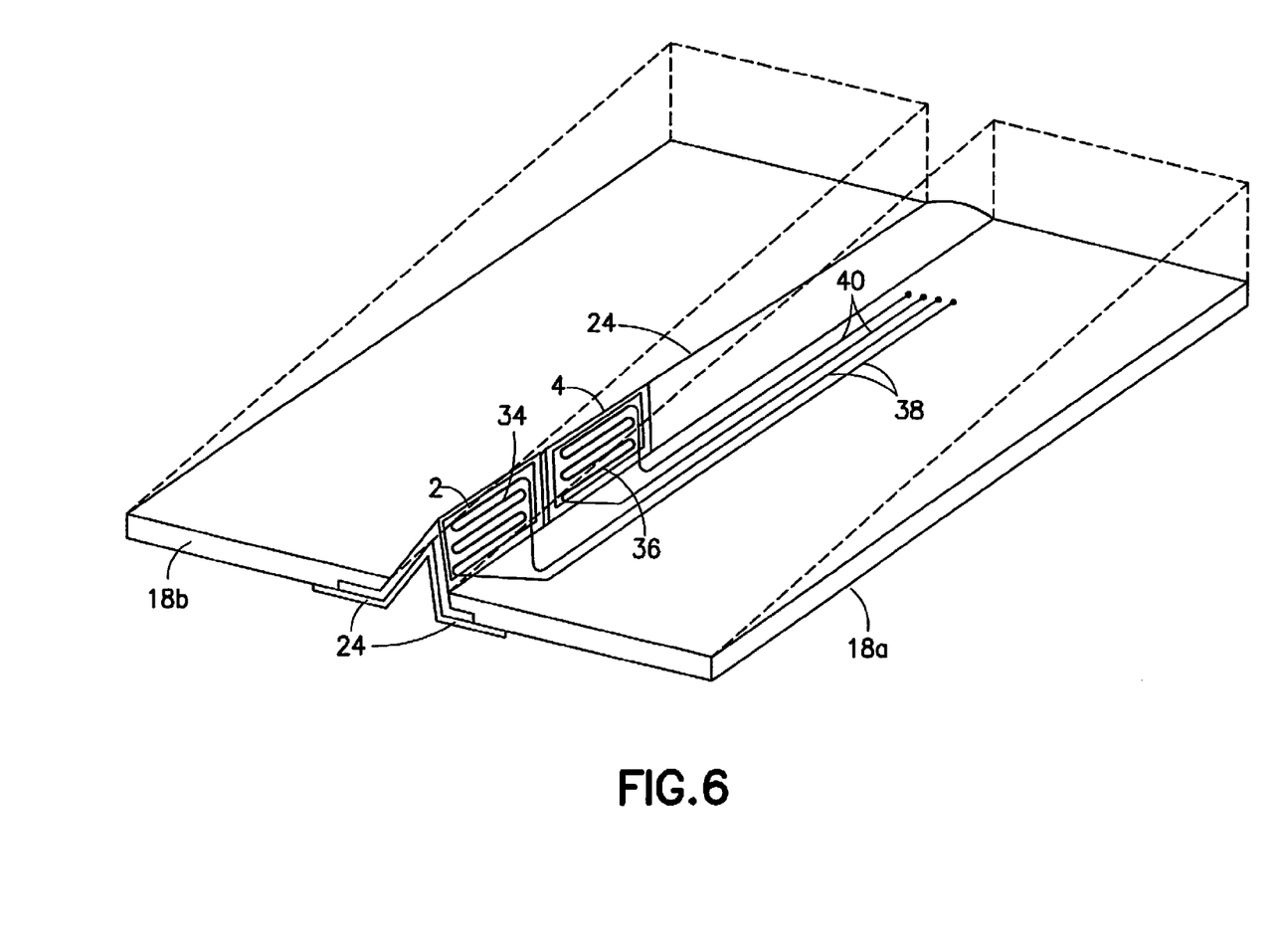
FIG. 6 is a diagram showing an isometric view (from above) of a pair of adjacent petals which can be alternatingly deflected inward or outward by heating one or the other of a pair of mutually antagonistic deformable actuators disposed in a gap near the trailing edges of the petals in accordance with a further embodiment. The dashed lines indicate the positions of the petal covers (not shown).

In accordance with the embodiment shown in FIG. 2, SMA actuator 2 is configured and trained to change shape in a manner that causes the petals 18a and 18b to deflect outward, while SMA actuator 4 is configured and trained to change shape in a manner that causes the petals 18a and 18b to deflect inward. The shape changes produce actuation forces for deflecting the petals. As seen in FIG. 2, the petal 18a and 18b are separated by a gap. The SMA actuators 2 and 4 project through the gap, with the leading edge of SMA actuator 2 being situated adjacent to the trailing edge of SMA actuator 4. The trailing edge of SMA actuator may be aligned with the trailing edges of petals 18a and 18b. In the implementation shown in FIG. 2, the remainder of the gap is occupied by an elastomeric seal 24. Alternatively, the elastomeric seal may extend underneath the SMA actuators 2 and 4, all the way to the trailing edges of petals 18a and 18b, as shown in FIG. 6 (to be described in detail later).

Figure 3:
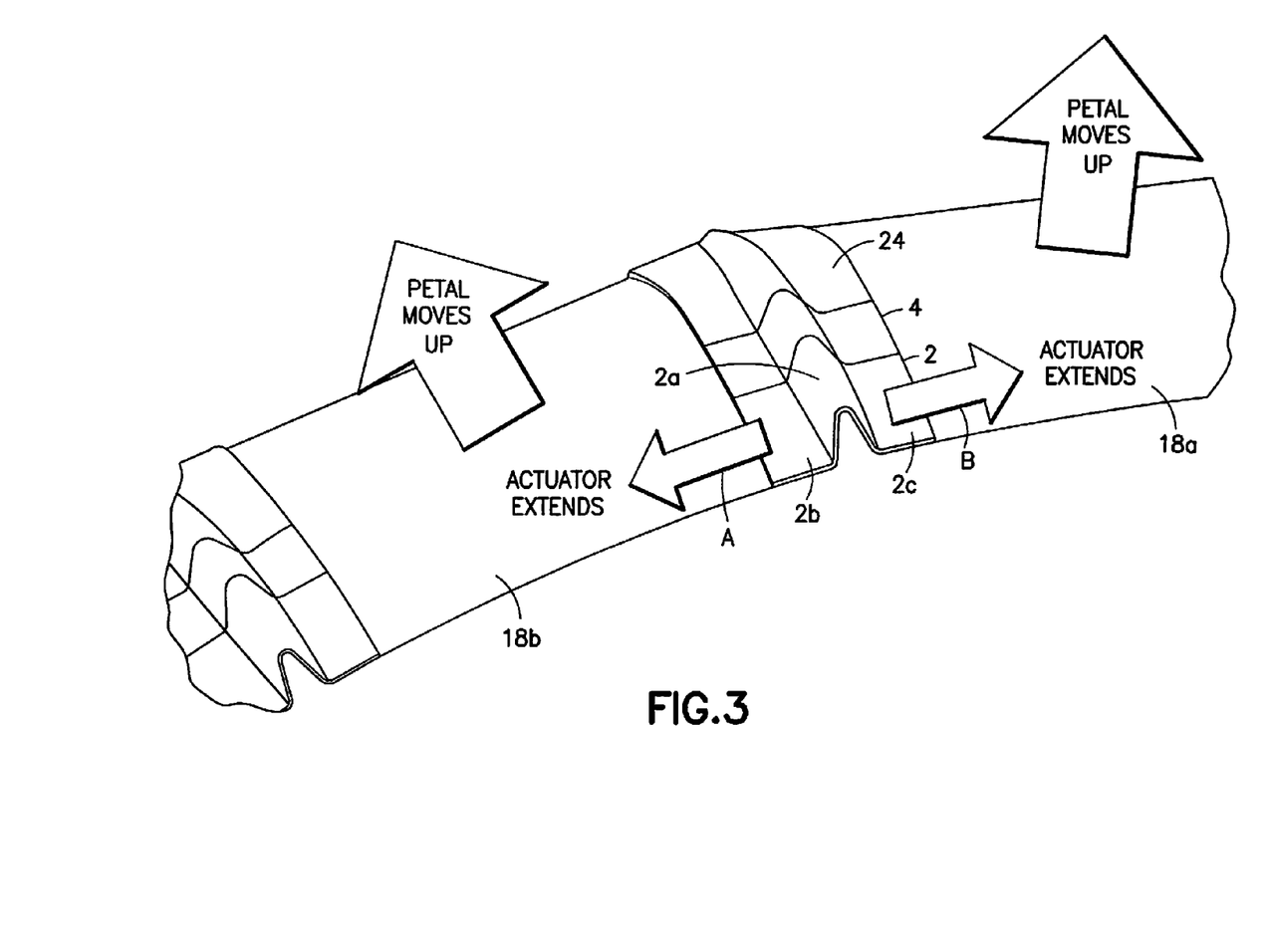
FIG. 3 is a concept diagram showing a pair of petals being deflected upward (i.e., outward) as one deformable actuator of a pair of mutually antagonistic deformable actuators extends (indicated by arrows A and B).
Figure 4:
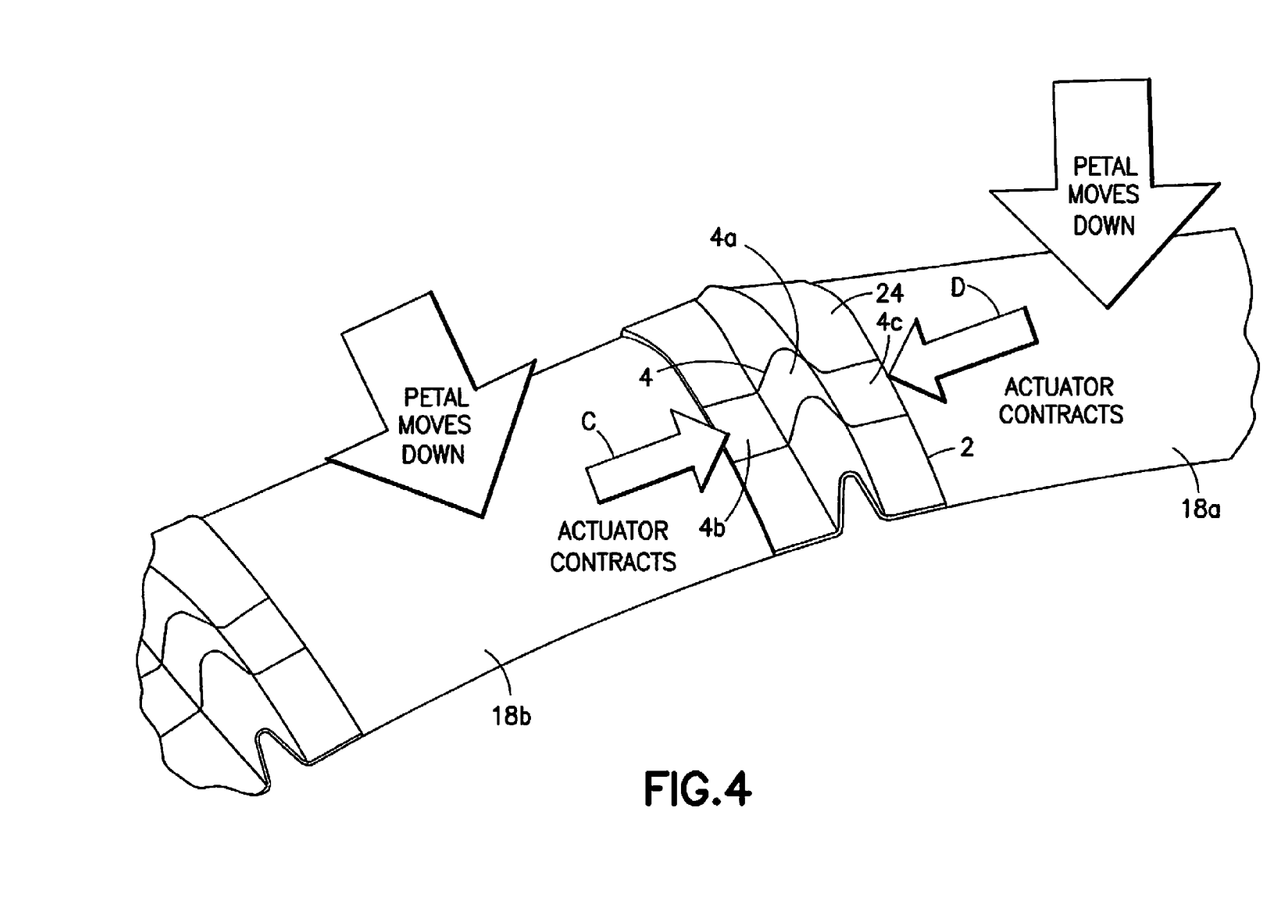
FIG. 4 is a concept diagram showing a pair of petals being deflected downward (i.e., inward) as the other deformable actuator a pair of mutually antagonistic deformable actuators contracts (indicated by arrows C and D).

The principle of actuation of SMA actuators 2 and 4 is shown in FIGS. 3 and 4. FIG. 3 shows petals 18a, 18b being deflected upward (i.e., outward) as SMA actuator 2 extends (indicated by arrows A and B). FIG. 4 showing petals 18a, 18b being deflected downward (i.e., inward) as SMA actuator 4 contracts (indicated by arrows C and D).

As shown in FIG. 3, the SMA actuator 2 is a body comprising an active portion 2a that spans the gap between petals 18a and 18b, a first flange 2b connected to active portion 2a and attached to petal 18b, and a second flange 2c connected to active portion 2a and attached to petal 18a. The active portion 2a is made of shape memory alloy having the characteristic that it undergoes a first shape change when its temperature is increased from below to above a transition temperature. The SMA actuator 2 is arranged to deflect petals 18a, 18b outward when active portion 2a undergoes the first shape change. Preferably flanges 2b and 2c of SMA actuator 2 are made of a material which is not susceptible to heat-induced shape change. For example, flanges 2b and 2c can be made of shape memory alloy which has not been trained to change shape at the aforementioned transition temperature.

As shown in FIG. 4, the SMA actuator 4 is also a body comprising an active portion 4a that spans the gap between petals 18a and 18b, a first flange 4b connected to active portion 4a and attached to petal 18b, and a second flange 4c connected to active portion 4a and attached to petal 18a. The active portion 4a is made of shape memory alloy having the characteristic that it undergoes a second shape change when its temperature is increased from below to above a transition temperature. The SMA actuator 4 is arranged to deflect petals 18a, 18b inward when active portion 4a undergoes the second shape change. Preferably flanges 4b and 4c of SMA actuator 4 are made of a material which is not susceptible to heat-induced shape change. For example, flanges 4b and 4c can be made of shape memory alloy which has not been trained to change shape at the aforementioned transition temperature.

The respective active portions 2a and 4a of SMA actuators 2 and 4 can be made of different shape memory alloys, in which case the respective transition temperatures referred to in the preceding two paragraphs may be different. Preferably, the respective active portions 2a and 4a each have a profile designed to minimize aerodynamic drag (e.g., a V-shaped cross section).

Figure 5:
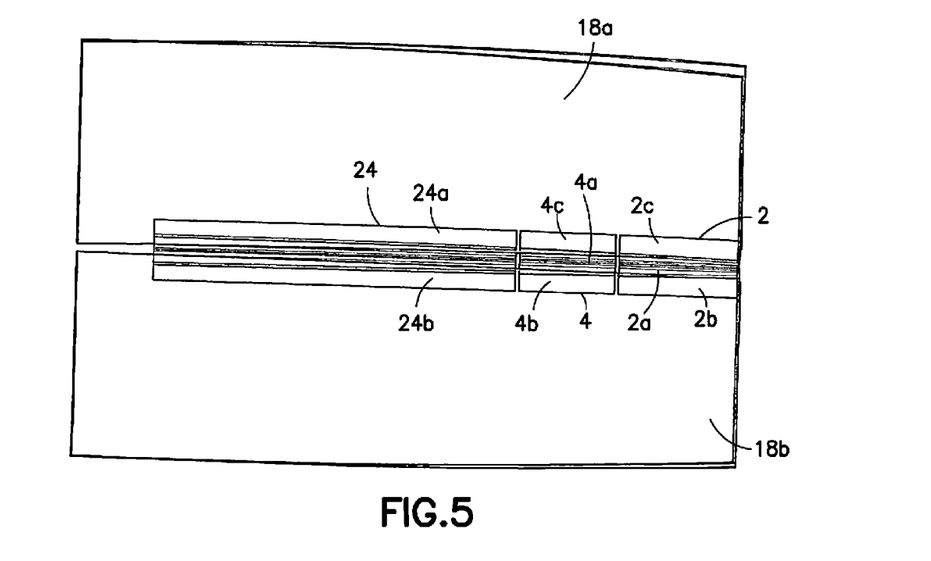
FIG. 5 is a diagram showing an isometric view (from below) of the petals and deformable actuators depicted in FIG. 2. Again the petals are shown in outwardly and inwardly deflected positions.

In accordance with one embodiment, the flanges 2b and 2c of SMA actuator 2 and the flanges 4b and 4c of SMA actuator 4 are attached to respective marginal portions of the inner surface of the petals 18a and 18b, as shown in FIG. 5. The elastomeric seal 24 may also comprise flanges 24a and 24b for attachment respective marginal portions of the inner surface of the petals 18a and 18b.

It should be appreciated that the shape memory alloy incorporated in the actuators described above are trained in accordance with the constrained motion which is desired, which in turn depends on the relative movements of the connected structures. The shape metal alloy can be trained for different degrees of motion based on designs of different "trainers" (mechanical mechanisms used to train a shape metal alloy to maintain its memory shape.)

The two main types of shape-memory alloys are copper-aluminum-nickel, and nickel-titanium (nitinol) alloys but shape memory alloys can also be created by alloying zinc, copper, gold, and iron. In various embodiments, the actuators may comprise nitinol, though various other shape memory alloys of copper, zinc, aluminum, nickel, titanium, palladium, and/or other materials can be used as well. The transition temperature of a shape memory alloy is highly sensitive to the composition of the alloy and can be selected by slightly varying the constituent ratios. The choice of material for the rods can be made based upon various design considerations such as operating temperature ranges, desired transition temperatures, desired transition times, combinations thereof, and the like.

More particularly, in some embodiments, the actuator can be formed from "nitinol 55", a binary form of nitinol that is 55% by weight nickel. It should be understood that this embodiment is illustrative, and should not be construed as being limiting in any way. For example, in some contemplated embodiments, the actuator can be formed from two or more alloys, wherein at least one of the alloys is a shape memory alloy and at least one of the alloys is not a shape memory alloy, such as steel, brass, and the like. As such, it will be understood that the actuators can be formed from a combination of materials and/or alloys such that the various portions or regions of the actuator react to different transition temperatures and/or transition at different times relative to other portions or regions of the actuator. For example, the active portion of each actuator can be formed of a shape memory alloy while the passive flanges are formed of alloys which are not shape memory alloys.

FIG. 6 presents an isometric view (from above) of a pair of adjacent petals 18a and 18b which can be alternatingly deflected inward or outward by heating one or the other of a pair of mutually antagonistic one-way SMA actuators 2 and 4 disposed in a gap near the trailing edges of the petals in accordance with a further embodiment. The dashed lines indicate the positions of the petal covers (not shown). In this embodiment, respective electric heaters are thermally coupled to the surfaces of the one-way SMA actuators 2, 4. When SMA actuator 2 is heated while SMA actuator 4 is not being heated, the actuation force produced by deformation of actuator 2 should be greater than the resistance to deformation of actuator 4 and vice versa.

FIG. 6 shows respective foil heaters 34 and 36 attached to respective surfaces of the active portions of SMA actuators 2 and 4. Each foil heater comprises conductive foil that that has been etched to form a serpentine pattern. During manufacturing, the foil is mounted to a backing and then etched into the desired pattern. The etched foil is then laid up in a dielectric matrix (e.g. silicone), connections (e.g., conductive foil tabs or wires) are led out of the matrix, and the matrix is then cured (removing the backing if necessary). Foil heater 34 is bonded and thereby thermally coupled to the visible (in FIG. 6) surface of the active portion of SMA actuator 2, and comprises a serpentine electrical conductor which is connected to a source (not shown) of electrical power by means of a pair of electrical conductors 38. Another foil heater (not visible in FIG. 6) can be bonded to the surface of the other side of active portion of the SMA actuator 2. Similarly, foil heater 36 is bonded and thereby thermally coupled to the visible surface of the active portion of SMA actuator 4, and comprises a serpentine electric conductor which is connected to a source (not shown) of electrical power by means of a pair of electrical conductors 40. Another foil heater (not visible in FIG. 6) can be bonded to the surface of the other side of active portion of the SMA actuator 4. As electrical current flows through the serpentine electrical conductors of the foil heaters heating coil, the shape memory alloy in the active portions of the actuators will be heated.

FIGS. 2-6 depict a petal deflection actuation system that utilizes pairs of mutually antagonistic one-way SMA actuators. In these embodiments, the SMA material is heated to transition from its martensitic shape (i.e., its shape when its crystalline state is martensite) to its austenitic shape (i.e., its shape when its crystalline state is austenite), thereby generating actuation forces for deflecting VAFN petals. Each one-way SMA actuator changes from its martensitic shape to its austenitic shape when heated sufficiently, stops changing shape when its heating element is de-energized, but then returns to its original shape when the other one-way SMA actuator changes from its martensitic shape to its austenitic shape (although the unheated actuator provides a resistance force that opposes the actuation force produced by the heated actuator.

In accordance with the aforementioned embodiments, when the two sets of mutually antagonistic SMA actuators are respectively heated and not heated, the throat area of the variable area fan nozzle decreases, and when the two sets of mutually antagonistic SMA actuators are respectively not heated and heated, the throat area increases. The fan nozzle throat area may be adjusted to under-area (compared to nominal area at cruise), which benefits fuel consumption during certain segments of flight mission, or to over-area, contributing to noise reduction and improving fan operability.

Generally, a shape memory alloy is a metallic alloy that has distinctly different phases on opposing sides of a transition temperature. A shape memory alloy reaches a first physical state when it is below its transition temperature and a second physical state when it is above its transition temperature. Some shape memory alloy materials can be trained to have a first shape for the cooler first state and a second shape for the warmer second state. A two-way trained shape memory alloy can forcibly assume the second shape when heated above the transition temperature and then gently return, if not otherwise restricted, to the first shape when cooled to below the transition temperature.

In accordance with alternative embodiments, a set of two-way SMA actuators can be used instead of paired one-way actuators. To enable two-way reversible actuation, the active portion of each SMA actuator can be fabricated from a two-way shape memory alloy adapted to transition, without an externally applied load, between a first trained shape and a second trained shape when the two-way shape memory alloy is thermally cycled between a first temperature and a second temperature to switch the two-way shape memory alloy between a first state to a second state. A method for making a two-way SMA element is disclosed in U.S. Published Patent Application No. 2005/0198777, the contents of which are incorporated by reference herein in their entirety In an exemplary embodiment, the first state is an austenitic state of the two-way shape memory alloy, and the second state is a martensitic state of the two-way shape memory alloy. When thermally activated or heated, the two-way shape memory alloy begins to enter the austenitic state at its austenite start temperature (temperature at which the transformation from martensite to austenite begins on heating). During this martensite-to-austenite transformation, the two-way SMA actuator deforms toward the first trained or austenitic shape. With continued heating, the two-way shape memory alloy eventually completes the martensite-to-austenite transformation at its austenite finish temperature (temperature at which the transformation from martensite to austenite finishes on heating). It should be understood that the austenite start and finish temperatures and rate of the martensite-to-austenite transformation can vary depending on the particular application and its thermal environment, the composition of the shape memory alloy materials being used, and/or the amount and rate of thermal energy applied to the two-way SMA actuator.

Upon cooling, the two-way shape memory alloy begins to enter a martensitic state at its martensite start temperature (temperature at which the transformation from austenite to martensite begins on cooling). During this austenite-to-martensite transformation, the two-way SMA actuator deforms toward the second trained or martensitic shape. With continued cooling, the two-way shape memory alloy eventually completes the austenite-to-martensite transformation at its martensite finish temperature (temperature at which the transformation from austenite to martensite finishes on cooling). It should be understood that the martensite start and finish temperatures and rate of the austenite-to-martensite transformation can vary depending on the particular application and its thermal environment, the composition of and particular SMA materials being used, and/or amount and rate of cooling or heat transfer from the two-way SMA actuator.

Referring again to FIGS. 3 and 4, a two-way SMA actuator can be substituted for the pair of one-way SMA actuators 2 and 4, with the trailing edge of the two-way SMA actuator being aligned with the trailing edges of the petals 18*a* and 18*b*. The two-way SMA actuator can have the same profile as the one-way actuators depicted in FIGS. 3 and 4. In accordance with one embodiment, the shape memory alloy of the two-way actuator can be trained so that the flanges of the actuator alternatingly move away from each other (i.e., extend) during heating and toward each other (i.e., contract) during cooling. In accordance with another embodiment, the shape memory alloy of the two-way actuator can be trained so that the flanges of the actuator alternatingly move toward each other during heating and move away from each other during cooling.

Cooling the two-way shape memory alloy can include passive cooling, active cooling, a combination thereof, etc. In one embodiment, the two-way shape memory alloy is passively cooled through heat exchange with its surrounding environment (e.g., structure, ambient atmosphere, etc.) once the supply of electrical power to the heating device is cutoff. Alternatively or additionally, the two-way shape memory alloy can be actively cooled, for example, if a higher rate of transformation to the martensitic state and shape is desired. By way of example, the two-way shape memory alloy can be actively cooled by circulating coolant over the two-way SMA actuator.

By way of further example, the two-way shape memory alloy can be actively cooled by supplying electrical power to a thermoelectric device having one side thermally coupled to the shape memory alloy. The thermoelectric device has the characteristic that heat flows from one side of the thermoelectric device to the other side. Accordingly, shape memory alloy can be cooled if it is thermally coupled to the cooled side of the thermoelectric device. Advanced thermoelectric devices are disclosed in U.S. Pat. No. 6,100,463, the contents of which are incorporated by reference herein in their entirety.

Figure 7:
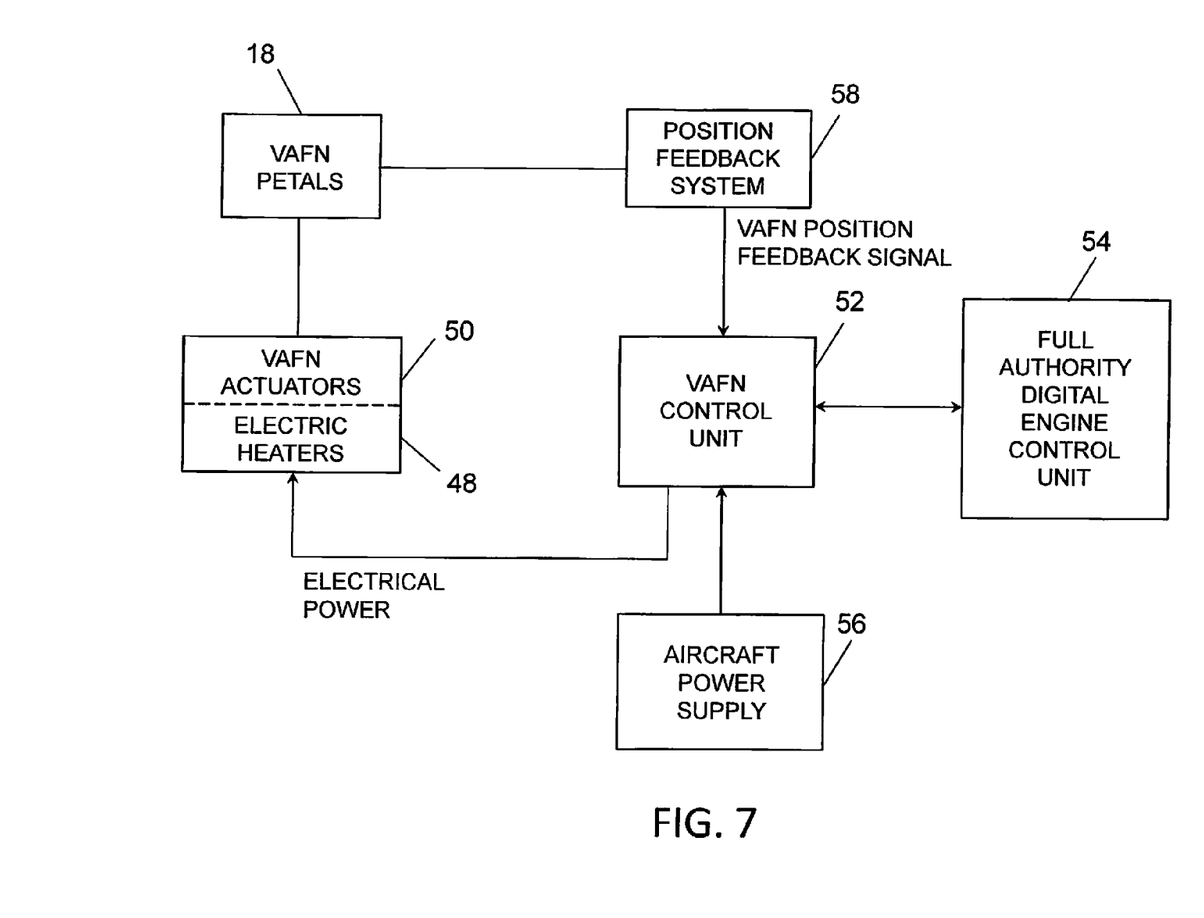
FIG. 7 is a block diagram with blocks representing some of the components of a petal deflection system in accordance with one embodiment.

The state of the SMA actuators can be controlled automatically in response to flight conditions. FIG. 7 shows the architecture of a system for controlling variable area fan nozzle petal deflection in accordance with one embodiment. The angular position of a plurality of VAFN petals 18 will depend on the temperatures of the shape memory alloy in the active portions of a plurality of VAFN actuators 50, which temperatures are in turn dependent on the amount of heat transferred to the shape memory alloy of the actuators by a plurality of electric heaters 48, which are thermally coupled to the actuators (as indicated by the horizontal dashed line separating the actuators 50 and heaters 48 in FIG. 7).

The amount of heat supplied by the electric heaters is controlled by an onboard VAFN control unit 52 which is a closed-loop control system. The VAFN control unit 52 may be implemented as part of a computer system (e.g., a central computer or processor), a subsystem computing module dedicated to controlling petal deflection, or the like. Optionally, the deflection of the petals 18 can be measured by a position feedback system 58 (e.g., a fiber optical system) comprising sensors installed in, on or near the VAFN petals 18 that output signals representing those measurements. The VAFN control unit 52 receives inputs from a full authority digital engine control unit 54 and from the position feedback system 58, and then continuously adjusts the degree of petal deflection via the actuation system, thereby adjusting the fan nozzle throat area, based on the petal positional information received.

For each VAFN actuator, the SMA actuator position depends on the amount of heat provided by the associated heating element. This is controlled by the VAFN control unit 52, which receives electrical power (e.g., 115 VAC) from an aircraft power supply 56 and then provides pulses or bursts of electrical power to the electric heaters 48 to maintain the actuators at specific positions. The VAFN control unit 52 is programmed to send a specific number of pulses to each heater (not necessarily an identical number of pulses to each heater) to deform each actuator into respective shapes that correspond to the target petal positions. The VAFN control unit 52 then receives the position feedback signals representing the actual (i.e., current) petal positions. In response to these position feedback signals, the VAFN control unit 52 will provide either more or less current pulses to keep each heater at specific temperature and subsequently each petal at target position.

To increase the flow area at the exit of the variable area fan nozzle when pairs of one-way SMA actuators are employed, the first one-way SMA actuator is heated while the second is not. To decrease the flow area at the exit, the first one-way SMA actuator is heated while the second is not. To achieve any target exit flow area between maximum and minimum exit flow areas, during either an opening or a closing cycle, the supply of heat to the heated actuator will be cutoff by the VAFN control unit when it calculates, based on the position feedback signals, that the current exit flow area is within a specified tolerance of the target exit flow area. Additional pulses of electrical power will be provided as needed to maintain a current exit flow area.

The SMA actuators can be heated by means other than electric heaters. It is known to supply pressurized hot air to an environmental control system using a compressor section of a gas turbine engine. This pressurized air is commonly called "bleed air" and is bled from bleed ports located at various stages of compression in a multi-stage compressor section of the engine. In accordance with alternative embodiments of a petal deflection system, the SMA actuators could be heated by opening a valve that diverts some bleed air to flow over a surface of the SMA actuator.

While variable area fan nozzles have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "computer system" should be construed broadly to encompass a system having at least one computer, processor or computing module, and which may have multiple computers, processors or computing modules that communicate through a network or bus.

The invention claimed is:

1. A variable area fan nozzle comprising:
    a support member having a curved shape;
    first and second petals disposed adjacent to each other at different circumferential positions along the curved shape of said support member with a gap separating respective edges of said first and second petals, said first and second petals being coupled to said support member in a manner that allows each of said first and second petals to deflect inwardly or outwardly, wherein a width of said gap varies as said first and second petal deflect inwardly or outwardly and
    a first actuator comprising a first portion that spans said gap, and second and third portions connected to said first portion and respectively attached to marginal portions along said edges of said first and second petals, wherein said first portion is made of shape memory alloy having a characteristic that it undergoes a first shape change when its temperature is increased from below to above a transition temperature, wherein said first actuator is arranged to cause said first and second petals to deflect when said first portion of said first actuator undergoes said first shape change.

2. The variable area fan nozzle as recited in claim 1, wherein said first and second petals deflect outward when said first portion of said first actuator undergoes said first shape change.

3. The variable area fan nozzle as recited in claim 1, wherein said first and second petals deflect inward when said first portion of said first actuator undergoes said first shape change.

4. The variable area fan nozzle as recited in claim 1, wherein said first portion of said first actuator has a V-shaped cross section.

5. The variable area fan nozzle as recited in claim 1, further comprising a second actuator comprising a first portion that spans said gap, and second and third portions connected to said first portion of said second actuator and respectively attached to said first and second petals, wherein:
    said first portion of said second actuator is made of shape memory alloy having the characteristic that it undergoes a second shape change when its temperature is increased from below to above a transition temperature;
    said second actuator is arranged to deflect said first and second petals inward when said first portion of said second actuator undergoes said second shape change; and
    said first actuator is arranged to deflect said first and second petals outward when said first portion of said first actuator undergoes said first shape change.

6. The variable area fan nozzle as recited in claim 1, wherein said shape memory alloy has a further characteristic that it undergoes a second shape change when its temperature is decreased from above to below said transition temperature, wherein said first actuator will deflect said first and second petals outward when said first portion of said first actuator undergoes one of said first and second shape changes and inward when said first portion of said first actuator undergoes other of said first and second shape changes.

7. The variable area fan nozzle as recited in claim 1, further comprising means for heating said first portion of said first actuator.

8. The variable area fan nozzle as recited in claim 1, further comprising a heating coil thermally coupled to a surface of said first portion of said first actuator.

9. The variable area fan nozzle as recited in claim 1, further comprising a seal made of elastomeric material, said seal comprising a portion that spans said gap between said first and second petals.

10. The variable area fan nozzle as recited in claim 1, comprising left and right fan nozzle assemblies, wherein each of said left and right fan nozzle assemblies comprises a respective support member having a curved shape, respective first and second petals arranged as recited in claim 1, and a respective first actuator which changes shape as recited in claim 1.

11. A variable area fan nozzle comprising:
    a support member having a curved shape;
    a plurality of petals which are circumferentially distributed along said support member and have edges with gaps therebetween and movable inwardly or outwardly for varying an exit or throat area of the nozzle and varying a width of said gaps; and
    a first plurality of petal deflection actuators attached to said petals, wherein each petal deflection actuator of said first plurality comprises shape memory alloy that changes shape when its temperature is increased from below to above a transition temperature, which shape changes in said first plurality of petal deflection actuators cause said petals to deflect, wherein each petal of said plurality is connected to an adjacent petal of said plurality by a respective one of said petal deflection actuators that spans the gap therebetween.

12. The variable area fan nozzle as recited in claim 11, further comprising a second plurality of petal deflection actuators attached to said petals, wherein each petal deflection actuator of said second plurality comprises shape memory alloy that changes shape when its temperature is increased from below to above a transition temperature, the shape changes in said first plurality of petal deflection actuators causing said petals to deflect outward and the shape changes of said second plurality of petal deflection actuators causing said petals to deflect inward.

13. The variable area fan nozzle as recited in claim 11, wherein the shape memory alloy also changes shape when its temperature is decreased from above to below said transition temperature, and wherein said petals deflect outward when said petal deflection actuators of said first plurality change shape as a result of increasing temperature and said petals deflect inward when said petal deflection actuators of said first plurality change shape as a result of decreasing temperature.

14. The variable area fan nozzle as recited in claim 11, wherein the shape memory alloy also changes shape when its temperature is decreased from above to below said transition temperature, and wherein said petals deflect inward when said petal deflection actuators of said first plurality change shape as a result of increasing temperature and said petals deflect outward when said petal deflection actuators of said first plurality change shape as a result of decreasing temperature.

15. An apparatus installed on an aircraft, comprising:
a sleeve or duct having a trailing lip area comprising a support member having a curved shape;
a plurality of petals which are circumferentially distributed along said support member with gaps therebetween and movable inwardly or outwardly for varying an exit or throat area of the nozzle and varying a width of said gaps;
a plurality of deformable elements distributed in said gaps, each deformable element comprising shape memory alloy that changes shape when heated to a temperature above a transition temperature;
a plurality of electric heaters thermally coupled to respective surfaces of said deformable elements; and
a computer system programmed to control the supply of electrical power to said electric heaters.

16. The apparatus as recited in claim 15, further comprising one or more sensors for generating position feedback signals representing the current positions of said petals, wherein said computer system is programmed to provide electrical pulses to said electric heaters to change or maintain the shapes of said deformable elements, the number of pulses being dependent on the results of a comparison of target position data representing target positions of said petals and position feedback data derived from said position feedback signals.

17. The apparatus as recited in claim 15, wherein one of said deformable elements comprises a first portion attached to a marginal portion along an edge of one of said petals and a second portion attached to a marginal portion along an edge of another petal adjacent to said one petal.

* * * * *